「12」 United States Patent
Sharma et al.

(10) Patent No.: US 11,373,165 B2
(45) Date of Patent: Jun. 28, 2022

(54) SYSTEMS AND METHODS FOR USE IN FACILITATING NETWORK TRANSACTIONS BASED ON USER AUTHENTICATION

(71) Applicant: MASTERCARD INTERNATIONAL INCORPORATED, Purchase, NY (US)

(72) Inventors: Prashant Sharma, Madison, NJ (US); Rajat Maheshwari, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 70 days.

(21) Appl. No.: 16/371,456

(22) Filed: Apr. 1, 2019

(65) Prior Publication Data
US 2020/0311712 A1    Oct. 1, 2020

(51) Int. Cl.
G06Q 20/32     (2012.01)
H04W 4/80     (2018.01)
G06Q 20/20     (2012.01)
G06Q 20/40     (2012.01)

(52) U.S. Cl.
CPC ......... G06Q 20/3278 (2013.01); G06Q 20/20 (2013.01); G06Q 20/4014 (2013.01); H04W 4/80 (2018.02)

(58) Field of Classification Search
CPC .................................. G06Q 20/3278
See application file for complete search history.

(56) References Cited

U.S. PATENT DOCUMENTS 6,062,472 A * 5/2000 Cheung ............... G06Q 20/341
10,566,082 B1 * 2/2020 McNair ............... G06F 16/9035
2008/0208762 A1 * 8/2008 Arthur .................. G06Q 20/20
2015/0193773 A1 * 7/2015 Mattioli ............. G06Q 20/4016
2016/0149883 A1 * 5/2016 Arunkumar ......... H04L 63/0846
2016/0283933 A1 * 9/2016 Orlando ............... G06Q 20/204

OTHER PUBLICATIONS

Nur, et.a, "A New Approach to Enhance Internet Banking Security, International Journal of Computer Application." (Year: 2017).*

* cited by examiner

Primary Examiner — Mike Anderson
Assistant Examiner — Brandon M Duck
(74) Attorney, Agent, or Firm — Harness, Dickey & Pierce, P.L.C.

(57) ABSTRACT

Systems and methods are provided for facilitating network transactions. One exemplary method includes receiving, by a computing device, via a first wireless connection, a credential from a mobile device where the credential is specific to an account associated with the mobile device. The method also includes determining an identifier of the mobile device, compiling an authorization request for the network transaction, where the authorization request includes the identifier and the credential, and transmitting the authorization request to a first party for authorization. The method further includes; receiving an authorization reply in response to the authorization request, where the authorization reply includes a result for the network transaction and the identifier, and transmitting, via a second wireless connection, a notification, including the result of the network transaction, to the mobile device, based on the identifier included in the authorization reply. The first wireless connection is different than the second wireless connection.

18 Claims, 3 Drawing Sheets

SYSTEMS AND METHODS FOR USE IN FACILITATING NETWORK TRANSACTIONS BASED ON USER AUTHENTICATION

FIELD

The present disclosure generally relates to systems and methods for use in facilitating network transactions based on authentication, and in particular, to systems and methods for facilitating data transmissions, through local wireless connections, relating to user authentication and in connection with network transactions.

BACKGROUND

This section provides background information related to the present disclosure which is not necessarily prior art.

Entities are known to offer various different products (e.g., goods and services, etc.) for sale to users. Users, in turn, are known to fund purchases of such products from the entities through payment accounts, often via payment devices such as, for example, credit cards, prepaid cards, payment fobs, virtual wallets, etc. Virtual wallets, for example, may be associated with one or more payment accounts, whereby credentials are provisioned to the virtual wallets and, in particular, smartphone devices in which the virtual wallets are installed. Consequently, a user is permitted to tap his/her smartphone, with a virtual wallet active therein, at a point-of-sale (POS) terminal at the merchant, to provide payment account credential(s) associated with a payment account to the POS terminal. In turn, the POS terminal captures the credential(s) from the smartphone and proceeds to compile and transmit an authorization request for the transaction to an issuer of the payment account. Subsequently, the POS terminal receives an authorization reply (indicating approved, or alternatively, decline for the transaction) from the issuer of the payment account. When approved, the POS terminal indicates the approval, and the merchant is then able to deliver the purchased product(s) to the user. That said, the POS terminal generally behaves similarly when the payment account credential(s) is/are provided from a credit card, a debit card, or by other known mechanisms, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
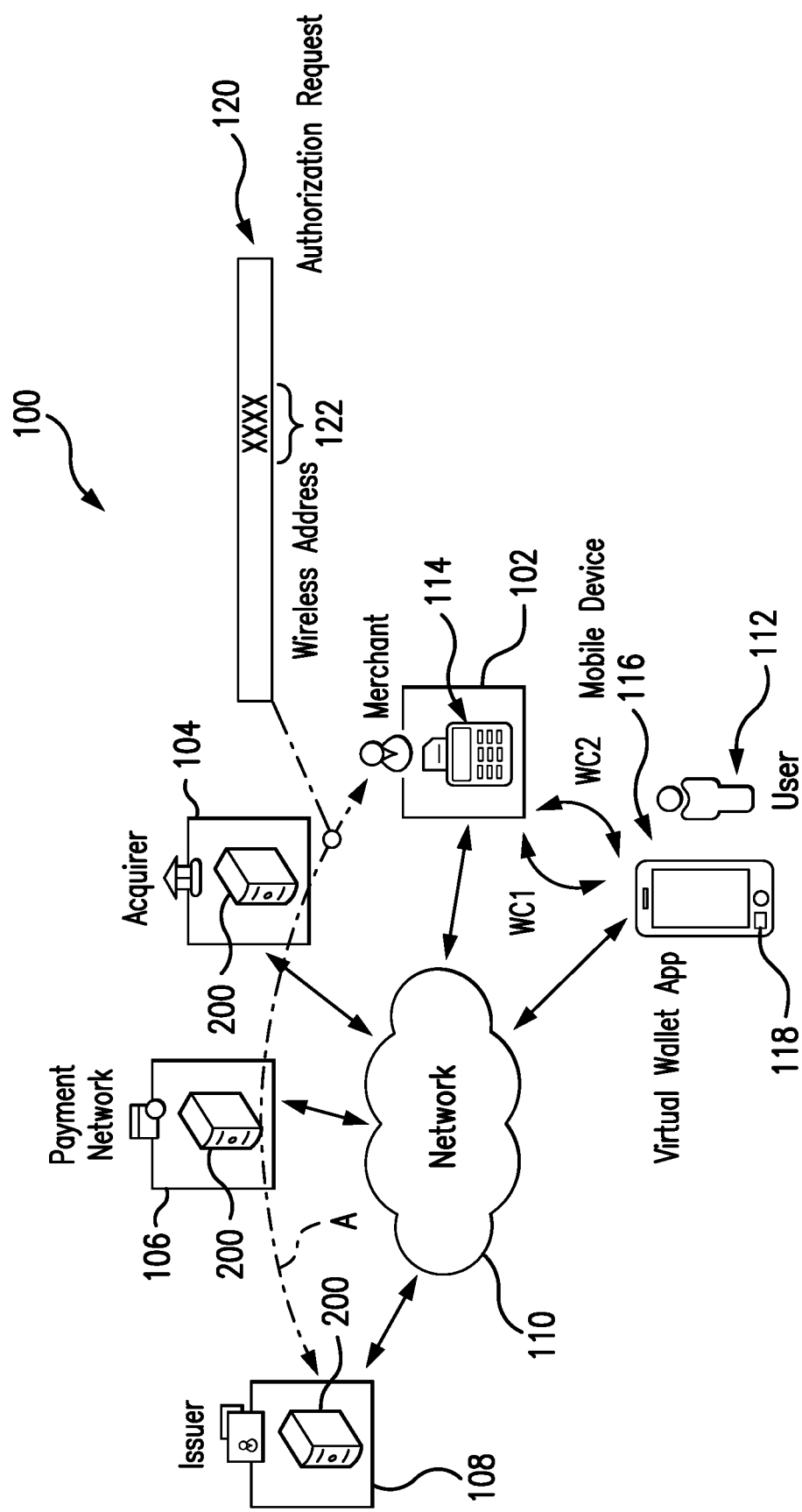
FIG. 1 is an exemplary system of the present disclosure suitable for use in facilitating network transactions based on user authentication, where results associated with the network transactions are provided from point-of-sale (POS) terminals to mobile devices of users.

Exemplary embodiments will now be described more fully with reference to the accompanying drawings. The description and specific examples included herein are intended for purposes of illustration only and are not intended to limit the scope of the present disclosure.

Transactions may be initiated by users, at merchants, through virtual wallet applications in mobile devices associated with the users, by authenticating of the users (e.g., via biometrics, PINs, etc.) and then tapping of the mobile devices at POS terminals of the merchants. The POS terminals, in turn, receive credentials from the virtual wallet applications, via local wireless connections (e.g., via near-filed communication (NFC), etc.), and proceed to compile and transmit authorization requests toward issuers of the payment accounts involved in the transactions for approval. When approved, the merchants and the users are notified at displays of the POS terminals. The notices are not conventionally communicated, by the POS terminals, to the mobile devices. Also, when the transactions fail (which is distinct from declined), neither the failure nor reasons for the failure are provided to the mobile devices. What's more, in some instances, the virtual wallet applications are permitted to provide the credentials only once, per authentication, whereby authentication is conventionally required to be repeated for subsequent transactions or transaction retries (e.g., based on transaction failures, etc.).

Uniquely, the systems and methods herein enable data indicative of status of the transactions to flow back to mobile devices, in connection with transactions performed by the mobile devices via virtual wallet applications installed therein. In particular, when a payment account credential is passed by a mobile device to a POS terminal in connection with a transaction, a wireless address (or other identifier) of the mobile device is also provided to the POS terminal and/or captured thereby. The POS terminal may then include the identifier in an authorization request for the transaction (and/or store the same in association with the transaction in memory). When the identifier is included in the authorization request, the payment network or other entity in the approval flow (e.g., the issuer, etc.) recognizes the identifier and appends the identifier to an authorization reply, as appropriate, directed back to the POS terminal. Upon receipt of the authorization reply, whether the identifier is included in the authorization reply (or stored in the POS terminal), the POS terminal is permitted to provide a result of the transaction to the mobile device, and specifically, to the virtual wallet therein. In this manner (and as a practical application), the virtual wallet application is informed of the result of the transaction (whether failed, approved, declined, or otherwise), whereby the virtual wallet application is permitted to perform consistent with payment rules associated with the payment account while also potentially reducing friction associated with the transactions and/or interactions with the POS terminal.

What's more, as needed, the POS terminal may optionally communicate one or more details of the transaction to the mobile device, which may permit the virtual wallet application to provide the credential to the POS terminal again (e.g., in connection with a failed transaction, etc.) without further authentication of the user (e.g., where the transaction is a retry, etc.), as explained more fully below (as another practical application). Providing the credential without the further authentication may also reducing friction associated with user authentication in such transactions and/or interactions with the POS terminal.

FIG. 1 illustrates an exemplary system 100, in which one or more aspects of the present disclosure may be implemented. Although the system 100 is presented in one arrangement in FIG. 1, other embodiments may include systems arranged otherwise depending, for example, on a manner in which payment account transactions are initiated, a manner in which wireless communication is facilitated, etc.

In the illustrated embodiment, the system 100 generally includes a merchant 102, an acquirer 104 associated with the merchant 102, a payment network 106, and an issuer 108 configured to issue payment accounts to users (e.g., consumers, etc.), each coupled to (and in communication with) network 110. The network 110 may include, without limitation, a local area network (LAN), a wide area network (WAN) (e.g., the Internet, etc.), a mobile network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which is accessible as desired to the merchant 102, the payment network 106, the issuer 108, and one or more devices associated with users in the system 100 (e.g., user 112, etc.), etc.

The merchant 102 in the system 100 is generally associated with products (e.g., goods and/or services, etc.) for purchase by one or more consumers (including the user 112). The merchant 102 offers the products for sale at a merchant location (e.g., a brick-and-mortar location, etc.). As shown in FIG. 1, the merchant 102 includes a point-of-sale (POS) terminal 114. The POS terminal 114 is configured, by executable instructions, to receive payment account credentials from payment devices, to compile and transmit authorization requests for payment account transactions, to receive authorization replies as describe more below, and/or to further operate as described herein (e.g., to communicate with mobile devices, etc.). It should be noted that the POS terminal 114 is configured to communicate wirelessly with one or more devices, for example, via NFC, RFID, ZigBee, and/or Bluetooth® communication schemes, etc.

In addition in the system 100, the user 112 is associated with a payment account, which is issued to the user 112 by issuer 108 and is suitable to fund transactions for the purchase of products from the merchant 102 (or other merchants as desired). The user 112 is further associated with a mobile device 116, which in the illustrated embodiment generally includes a portable communication device such as a smartphone, a tablet, a laptop, etc. As shown in FIG. 1, the mobile device 116 includes a virtual wallet application 118. The virtual wallet application 118 includes executable instructions, stored in a non-transitory storage media within the mobile device 116, which cause the mobile device 116 to perform the various operations described herein. In various embodiments, the virtual wallet application 118 may include, for example, PayPass® from MasterCard®, Apple Pay® from Apple®, PayWave® from Visa®, etc., or other suitable application offered by the merchant 102, by the payment network 106, by the issuer 108, or by other entities, etc. What's more, the virtual wallet application 118 may include one or more software development kits (SDKs) (e.g., provided by the payment network 106 or other entity, etc.), which includes executable instructions that enable the mobile device 116 to operate as described herein.

When the virtual wallet application 118 is installed in the mobile device 116 (e.g., during a setup operation of the virtual wallet application 118 or at a later time, etc.), the user 112 is prompted to provision his/her payment account to the virtual wallet application 118, whereby one or more credentials (i.e., which is/are specific to the user's payment account), such as, without limitations, a primary account number (PAN), a card verification code (CVC), an expiration date, and/or a token, etc. associated with the payment account is/are provisioned to the mobile device 116 for subsequent use as described herein. The credentials, in general, are stored within a secure element (SE) and/or a trusted execution environment (TEE) within the mobile device 116, whereby access to the credentials is restricted based on authentication of the user 112 to the mobile device 116.

With that said, when the mobile device 116 is described as configured to perform various operations herein, it should be appreciated that the configuration is provided by the virtual wallet application 118 (or SDK therein), other applications within the mobile device 116, and/or an operating system of the mobile device 116, etc.

Figure 2:
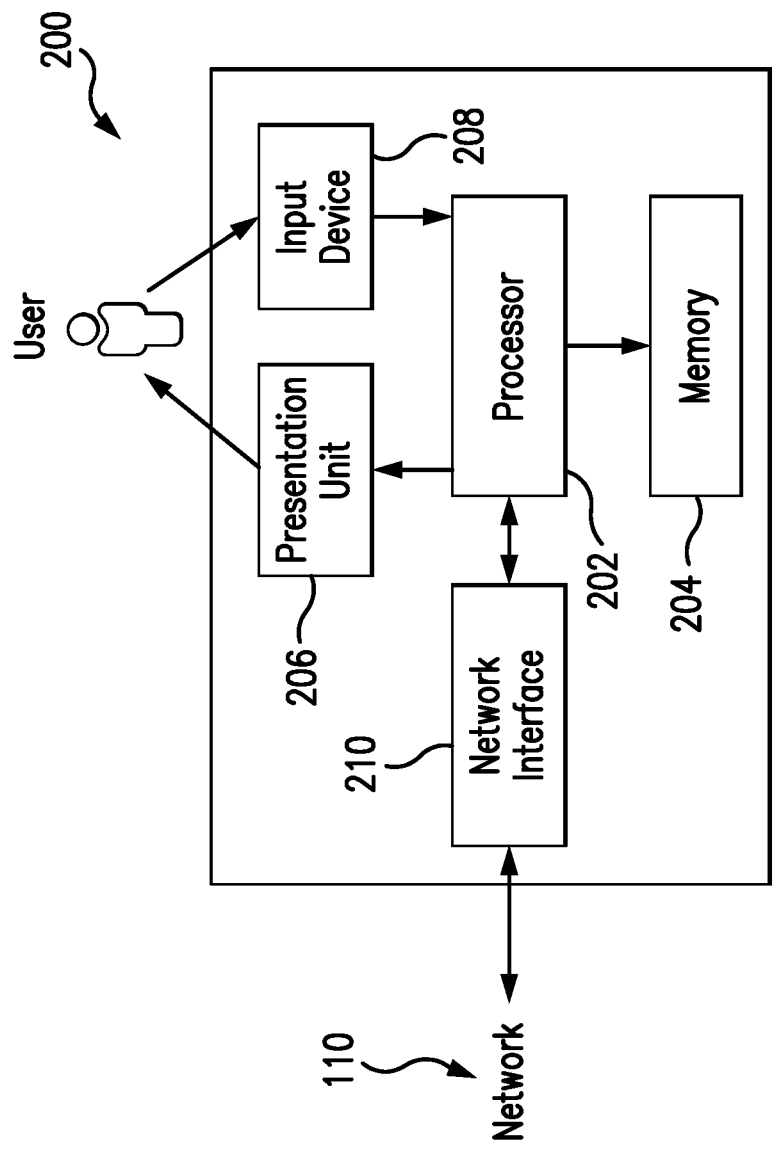
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, POS terminals, laptops, tablets, smartphones, PDAs, etc. In addition, the computing device 200 may include a single computing device, or it may include multiple computing devices located in close proximity or distributed over a geographic region as a network of computing devices, so long as the computing devices are specifically configured to function as described herein. In particular, in the exemplary system 100 of FIG. 1, each of the acquirer 104, the payment network 106, and the issuer 108 are illustrated as including, or being implemented in, computing device 200, coupled to the network 110. In addition, the POS terminal 114 at the merchant 102 and the mobile device 116 associated with the user 112 are also consistent with computing device 200. Further, in various embodiments, the merchant 102 may also include and/or may be implemented in one or more additional computing devices consistent with computing device 200. That said, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, addresses, transaction amounts, transaction IDs, and/or other types of data (and/or data structures) suitable for use as described herein. Furthermore, in various embodiments, executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In addition in the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., results of transactions, failure conditions, etc.), either visually or audibly to a user of the computing device 200, for example, to the user 112 in the system 100, to users associated with other parts of the system 100, etc. And, various interfaces (e.g., as defined by applications, webpages, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

The computing device 200 also includes an input device 208 that receives inputs from the user (i.e., user inputs) such as, for example, authentication inputs, transaction requests, etc. The input device 208 is coupled to (and is in communication with) the processor 202 and may include, for example, a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device (e.g., the mobile device 116, etc.), may behave as both the presentation unit 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a ZigBee adapter, an RFID adapter, a Bluetooth adapter, etc.), a mobile network adapter, a combination thereof, or other device capable of communicating to/with one or more different networks, including the network 110. It should be appreciated that the computing device 200, in various embodiments, may be configured, by the network interface 210, to communicate through multiple different types of wireless networks, etc. Further, in some exemplary embodiments, the computing device 200 may include the processor 202 and one or more network interfaces (including the network interface 210) incorporated into or with the processor 202.

Referring again to FIG. 1, when the user 112 desires to initiate a payment account transaction with the merchant 102, via the virtual wallet application 118 in the mobile device 116, the user 112 opens the virtual wallet application 118, whereupon the mobile device 116, as configured by the virtual wallet application 118, solicits an authentication input from the user 112. The authentication input may include, for example, a biometric (e.g., a fingerprint, a facial image, etc.), a PIN, a password, a motion, etc. When presented, the mobile device 116, as configured by the virtual wallet application 118, captures the authentication input and validates the authentication input against a reference, either stored in the mobile device 116 (e.g., in an SE or TEE, etc.) or remote from the mobile device 116 (e.g., compares the captured input against the reference in a manner generally known in the art, etc.). Based on the validation, the mobile device 116 is informed whether the user 112 is authorized to use to the virtual wallet application 118 and/or payment account provisioned thereto.

When authenticated, the user 112 may then "tap" the mobile device 116 at the POS terminal 114 of the merchant 102, whereupon a wireless connection (e.g., a NFC connection, etc.) is established between the mobile device 116 and the POS terminal 114. The wireless connection is designated WC1 in FIG. 1. For an NFC connection, it should be understood that the NFC connection is a short ranges connection, whereby the mobile device 116 is required to be within close proximity to the POS terminal 114 (e.g., within about four centimeters, or otherwise, etc.). When the wireless connection is otherwise, yet wireless, additional interactions may be required between the mobile device 116 and the POS terminal 114 (and/or the user 112 and/or a salesperson operating the POS terminal 114) to ensure the correct mobile device is communicating with the correct POS terminal (e.g., and not a different POS terminal in another checkout line or mobile device of a different user, etc.).

With reference again to the example NFC connection, in particular, in this exemplary embodiment, the POS terminal 114 is configured to perform as a central device and the mobile device 116 is configured to perform as a peripheral device, whereby the mobile device 116 is configured to advertise a packet indicative of the mobile device 116 at one or more intervals. In at least one embodiment, the advisement may include specific information about the mobile device 116 (or the payment account of the user 112), including, without limitation, an identifier associated therewith, as described below. The POS terminal 114 is configured to scan for the advertisement, identify the advertisement and request a response from the mobile device 116, based on the advertisement, whereby the NFC connection between the POS terminal 114 and the mobile device 116, in this example, is established. The mobile device 116 and/or the POS terminal, then, may be configured to exchange any data associated with the transaction that is desirable, including, without limitation, a payment account credential, a unique identifier of the mobile device 116 (e.g., a Bluetooth® Low Energy (BLE) address, a MAC address, or another suitable address of the mobile device 116, etc.), transaction details (e.g., a transaction ID, a transaction amount, a transaction currency, etc.), etc. It should also be appreciated that rather than the advisement process described above, a different exchange may be provided between the POS terminal 114 and the mobile device 116 (e.g., depending on the type of wireless connection therebetween, etc.), yet consistent with the description herein.

In connection with the interaction between the POS terminal 114 and the mobile device 116, the POS terminal 114 is configured to recognize and/or capture the identifier associated with the mobile device 116, which, in this embodiment, includes a BLE address, and to store the address in memory (e.g., the memory 204, etc.) in association with the specific transaction (e.g., to distinguish the mobile device 116 from other mobile devices in the vicinity, etc.).

Further, in response to receiving the credential for the user's payment account, from the mobile device 116 (and the virtual wallet application 118), the POS terminal 114 is configured to compile an authorization request for the transaction, including the payment account credential, an amount of the transaction, a currency, a merchant ID, and other data specific to the transaction (e.g., a transaction ID, etc.) and the merchant (e.g., a merchant name, an MCC, etc.), etc. Uniquely, the POS terminal 114 is configured to include the identifier of the mobile device 116 in the authorization request. In FIG. 1, the authorization request compiled by the POS terminal 114 is illustrated and referenced at 120. The authorization request 120, then, includes a segment 122 in which the identifier of the mobile device 116 is included (as indicated by generic characters "XXXX"). When the identifier includes the BLE address, for example, the identifier will include a 48-bit (6 byte) hexadecimal number that uniquely identifies the mobile device 116 among other devices (e.g., (XX:YY:ZZ:80:E1:00), etc.). It should be appreciated that the BLE address is included, as the identifier, in the authorization request 120 at a specific and/or designated data element (DE). The POS terminal 114 is further configured to then transmit the authorization request 120 to the acquirer 104 (associated with the merchant 102), along path A in the system 100.

Upon receipt of the authorization request 120, the acquirer 104 is configured to forward and/or to communicate the authorization request 120 to the issuer 108, again along path A, generally through the payment network 106, such as, for example, through the Mastercard®, VISA®, Discover®, American Express®, etc. payment network.

Uniquely, the payment network 106 is configured to identify the authorization request 120 as including the identifier, for example, based on the BLE address being populated into a specific DE of the authorization request 120. The payment network 106 is configured to then identify the transaction (e.g., by the transaction ID, etc. and/or otherwise in a manner sufficient to identify an authorization reply for the same transaction; etc.) and to store the wireless address in memory (e.g., the memory 204, etc.) in connection with the transaction. The payment network 106 is further configured to pass the authorization request 120 on to the issuer 108. In turn, the issuer 108 is configured to determine if the user's payment account is in good standing and if there is sufficient funds and/or credit to cover the transaction. Thereafter, the issuer 108 is configured to compile and transmit an authorization reply (indicating the approval or the decline of the transaction, which is generally a "result" of the transaction) back to the merchant 102, again along path A. As the authorization reply is received at the payment network 106, the payment network 106 is configured to identify the authorization reply to the same transaction (i.e., the transaction associated with the previously identified authorization request), based on the transaction ID or otherwise, and to append the wireless address of the mobile device 116 to the authorization reply. The payment network 106 is then configured to forward and/or to communicate the authorization reply on to the merchant 102, via the acquirer 104, along path A.

In should be appreciated that in at least one embodiment, the issuer 108 (and not the payment network 106) may recognize the identifier (e.g., the BLE address, the MAC address, etc.) included in the authorization request and compile the authorization reply to include the identifier in a particular DE, as included in the authorization request or otherwise indicated as the proper DE for the identifier.

With further reference to FIG. 1, upon receipt of the authorization reply at the merchant 102, the POS terminal 114 is configured to provide a notification to the merchant 102, for example, at a presentation unit 206 of the POS terminal 114, indicating the result of the transaction: Approved or Declined. In addition, the POS terminal 114 is configured to establish a wireless connection with the mobile device 116 based on the identifier included in the authorization reply (e.g., the BLE address, the MAC address, etc.) and to transmit the result of the transaction (e.g., approved, declined, failed, etc.) (e.g., from the authorization reply, based on a transaction status as the POS terminal 114, etc.) to the mobile device 116, via the wireless connection (e.g., a Bluetooth® connection, etc.). It should be noted that, in this exemplary embodiment, a different wireless connection (WC2) other than the wireless connection (WC1) may be used to pass the payment account credential (i.e., the NFC connection, etc.). Consequently, in this exemplary embodiment, the proximity requirement of the NFC connection (e.g., about four centimeters, or otherwise) is alleviated, whereby the POS terminal 114 is permitted to rely on a wireless connection with enhanced range to relay the result to the mobile device 116. The different wireless connections are designated WC1 and WC2 in FIG. 1. When the transaction is halted based on failed wireless connection or otherwise, the POS terminal 114 may be configured to also provide the transaction ID, terminal ID, transaction amount and currency to the mobile device 116.

In such embodiments when the transaction is halted based on a communication failure (e.g., between POS terminal 114 and the mobile device 116, etc.), a network failure on the POS terminal side (e.g., between the POS terminal 114 and the acquirer 104, the payment network 106, or other entity (or device) between the POS terminal 114 and the issuer 108, etc.), or otherwise, the mobile device 116, as configured by the virtual wallet application 118, confirms that the terminal ID, the amount and/or the currency is consistent with the latest transaction (after the user authentication), as originally initiated, and if confirmed, again passes the payment account credentials to the POS terminal 114. The POS terminal 114 is configured, again, to compile and transmit an authorization request as described above, as a transaction retry. In this manner, the mobile device 116, and in particular, the virtual wallet application 118, is informed that the transaction has not been approved, and thus the credentials are provided after the authentication has not been "used." As such, the mobile device 116 and the POS terminal 114 are permitted to retry the transaction after a transaction failed result (e.g., communication failure, network failure, etc.) (but not a decline), but without the user 112 having to be authenticated again, as the original authentication is sufficient based on the consistency of the transaction data passed from the POS terminal 114 to the mobile device 116.

Figure 3:
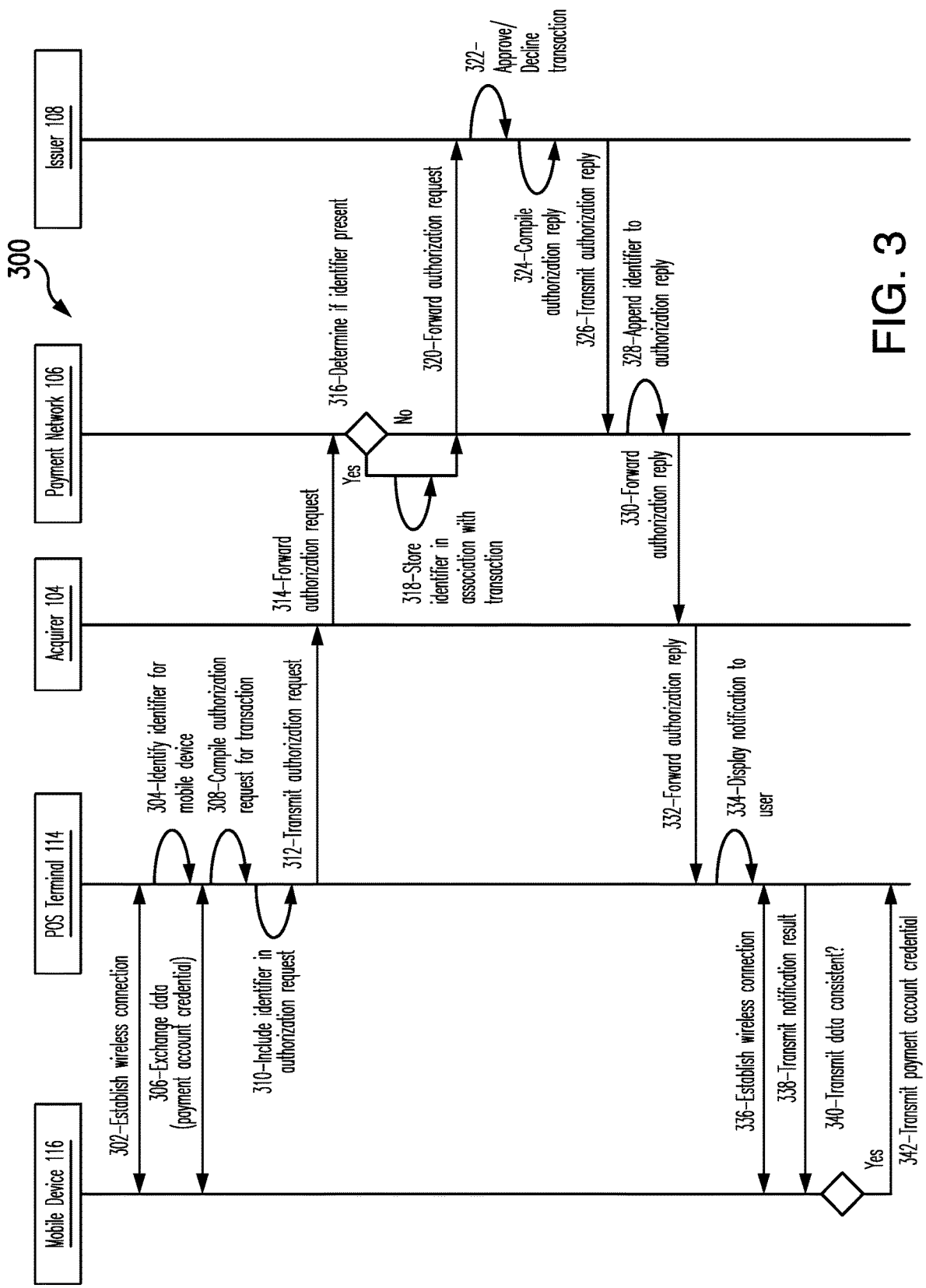
FIG. 3 is an exemplary method that may be implemented in the system of FIG. 1 for use in facilitating transmission of a result associated with a network transaction to a mobile device involved in initiating the transaction, through a wireless connection.

FIG. 3 illustrates an exemplary method 300 or use in facilitating transmission of a result associated with a network transaction to a mobile device involved in initiating the transaction, through a wireless connection. The exemplary method 300 is described with reference to the system 100 and the computing device 200. However, it should be understood that the method 300 is not limited to the system 100 or the computing device 200. And, likewise, the systems and the computing devices herein should not be understood to be limited to the exemplary method 300.

With reference now to FIG. 3, when the user 112 decides to make a purchase at the merchant 102, via the virtual wallet application 118, the user 112 pulls out the mobile device 116, accesses the virtual wallet application 118 at the mobile device 116, and then authenticates himself/herself thereto. As explained above, the authentication may be based on an input to the mobile device 116 such as, for example, a biometric associated with the user 112, a passcode or PIN known to the user 112, or otherwise, etc. (as is generally known). The mobile device 116 validates the input from the user 112 against a reference to authenticate the user 112.

Once authenticated, the user 112 selects a payment account in the virtual wallet application 118 to fund the transaction and "taps" the mobile device 116 at the POS terminal 114. In particular, the user 112 brings the mobile device 116 within close proximity of the POS terminal 114, for example, within about four centimeters, to establish a NFC connection. It should be appreciated that the interaction and proximity of the mobile device 116 and the POS terminal 114 may be otherwise for other, different wireless connections. When the mobile device (after the user 112 is authenticated and the payment account selected) is brought within the range of the POS terminal 114, a wireless connection is established between the mobile device 116 and the POS terminal 114, at 302 (e.g., WC1 in the system 100 of FIG. 1, etc.). In particular, as described above, the mobile device 116 (when instructed to "pay" through the virtual wallet application 118) transmits an advertisement, via a NFC wireless adapter associated therewith (e.g., network interface 210, etc.), at one or more intervals (e.g., about 20 ms, etc.). When the POS terminal 114 receives the advertisement(s), the POS terminal 114 transmits a scan response request. The mobile device 116, then, in response to the request, provides scan response data, whereby the NFC connection is established between the POS terminal 114 and the mobile device 116.

Further, the mobile device 116 and the POS terminal 114 exchange data, at 304, via the NFC connection. The data provided from the mobile device 116 to the POS terminal 114 includes, for example, one or more credentials for the user's payment account and an identifier associated with the mobile device 116. In connection therewith, the POS terminal 114 recognizes or identifies (broadly, determines), at 306, the identifier of the mobile device 116. The identifier may include a BLE address, a MAC address or another wireless network associated address (e.g., with which the POS terminal 114 is enabled to communicate with the mobile device 116, etc.). More generally, the identifier permits the POS terminal 114 to uniquely identify the mobile device 116 to the exclusion of other devices in the vicinity of the POS terminal 114, for the given transaction. It should be appreciated that a variety of data may be passed between the mobile device 116 and the POS terminal 114, as part of the advertisement or separately through the wireless connection at this time, as illustrated in FIG. 3. Optionally, in at least one embodiment, the POS terminal 114 may pass certain data to the mobile device 116 including, for example, a terminal ID, a transaction ID, an amount, a currency, etc.

Thereafter, at 308, the POS terminal 114 compiles an authorization request (broadly, an authorization message) for the transaction. In this exemplary embodiment, the authorization request is provided in a format defined by the ISO 8583 standard, which includes, for example, a terminal ID for the POS terminal 114, a transaction amount, a transaction currency, a merchant ID for the merchant 102, a merchant name, a payment account credential, etc. It should be appreciated that various other data may be included in the authorization request, as specific to the merchant 102, the user 112, and/or the transaction. Uniquely herein, the POS terminal 114 also includes, at 310, the identifier of the mobile device 116 (e.g., the BLE address, etc.) in the authorization request, at a designated and/or specific DE of the authorization request. The authorization request is then transmitted, by the POS terminal 114, at 312, to the acquirer 104.

And, the acquirer 104, in turn, forwards the authorization request (including the identifier) to the payment network 106, at 314.

At 316, the payment network 106 determines if the authorizations request includes the identifier, at the specific DE designated for the identifier. It should be appreciated that in addition to the DE, or alternatively, the payment network 106 may recognize the identifier based on a format of the identifier, etc. If the identifier is included, the payment network 106 stores, at 318, the identifier in memory (e.g., memory 204, etc.) in association with the transaction. Specifically, for example, the payment network 106 may store the identifier along with a transaction ID or terminal ID associated with the POS terminal 114, or in another manner/association, which permits the payment network 106 to identify the identifier to a subsequent authorization reply for the specific transaction. After storing of the identifier in association with the transaction, or if the identifier is not included in the authorization request (i.e., "NO" from step 314), the payment network 106 forwards the authorization request (including the identifier, when included) to the issuer 108, at 320.

In response, the issuer 108 determines whether to approve or decline the transaction, at 322. The determination may be based on the standing of the user's payment account, the available funds or credit in/associated with the payment account, fraud scoring for the transaction, or various other factors. Thereafter, the issuer 108 compiles an authorization reply, at 324. Like the authorization request, the authorization reply is provided in a format defined by the ISO 8583 standard and includes much the same data as included in the authorization request, and also includes a result of the transaction (e.g., approved, declined, etc.). The authorization reply is then transmitted, by the issuer 108, at 326, to the payment network 106.

With continued reference to FIG. 3, the payment network 106 intercepts the authorization reply and appends the identifier to the authorization reply, at 328. In connection therewith, the payment network 106 identifies the transaction based on a transaction ID or terminal ID and searches in the memory (e.g., the memory 204, etc.) for a transaction having the transaction ID or terminal ID (or other identifying data), etc. When found, the payment network 106 retrieves the identifier (e.g., BLE address, etc.) for the transaction and includes the identifier in the authorization reply for the transaction. The payment network 106 will, in general, append the identifier to a DE in the authorization reply, which may be the same or different than the DE in which the identifier was included in the authorization request. The payment network 106 then forwards the authorization reply to the acquirer 104, at 330.

The acquirer 104, in turn, forwards the authorization reply (including the identifier) to the POS terminal 114 of the merchant 102, at 332.

Upon receipt of the authorization reply, the POS terminal 114 displays, at 324, the result of the transaction at a presentation device of the POS terminal 114 (e.g., the presentation unit 206, etc.). For example, the POS terminal 114 may display a notification, at 334, to the user 112 at the presentation device of the POS terminal 114, where the notification includes an "Approved" notification or a "Decline" notification. In addition, when the authorization reply is received, the POS terminal 114 communicates, based on the identifier included in the authorization reply, the result of the transaction to the mobile device 116. This may involve, again, the POS terminal 114 and the mobile device 116 establishing a wireless connection, at 336, which, in this embodiment, may be a Bluetooth® connection based on the BLE address (and different than the NFC connection) (e.g., WC2 in the system 100 of FIG. 1, etc.). The POS terminal 114 transmits, at 338, a notification indicative of the result of the transaction to the mobile device 116. For example, when a transaction is approved or declined, the notification may simply include a designation of the transaction and the result "approved" or "declined." The mobile device 116 may, optionally, display the result of the transaction to the user 112.

Apart from an approved or declined result, the transaction may have a failed result. Specifically, the transaction may fail due to a communication failure, or a network error, or other issue with the communication channel between the POS terminal 114 and the mobile device 116, or between the POS terminal 114 and another entity (e.g., as shown in FIG. 1), etc., thereby providing a "failed" result. In such instances, the POS terminal 114 transmits, at 338, a notification, which includes the "failed" result and, optionally, also transaction data for the transaction (e.g., a transaction ID, transaction amount, transaction currency, etc.). When the "failed" result is provided, the POS terminal 114 may further wait or listen for a payment account credential, from the mobile device 116, for a transaction retry. In connection therewith, the mobile device 116 may automatically provide the payment account credential, or the mobile device 116 may request an input from the user 112 to proceed with such retry.

In response, upon receipt of the "failed" result (and, potentially, upon receipt of an input from the user 112 confirming to proceed with the retry), the mobile device 116 (and in particular, the virtual wallet application 118) verifies, at 340, that the transaction data received from the POS terminal 114 is consistent with the transaction data previously received from the POS terminal 114 (e.g., at 302 or 306, etc.). When the transaction data is consistent (e.g., a match, etc.), the mobile device 116 understands that the transaction is a retry for the same transaction and provides, at 342, the payment account credential to the POS terminal 114, either through the wireless connection established at 334 or via the NFC connection consistent with the above. In connection therewith, because this is the same transaction (i.e., a retry), the mobile device 116 maintains the authentication status (e.g., that the user is authenticated for the transaction, etc.) and/or sets the cardholder verification method (CDCVM) to be valid for the transaction. It is notable that this is contrary to the conventional operation of the mobile device, whereby the CDCVM is only set for a transaction after a "fresh" authentication of the user 112 in the context of the specific transaction (i.e., prior to a payment account credential being provided as described above in FIG. 3). By maintaining the authentication state and/or the CDCVM as described above, the mobile device 116, for the retry transaction, avoids a further authentication of the user for a transaction for which the user 112 has already been authenticated. In addition to the above, the mobile device 116 may further provide status of prior transactions to the POS terminal 114 in the form of a score (e.g., a risk score, etc.), which may be provided to the issuer 108 in a subsequent authorization request, thereby permitting additional data to flow to the issuer 108 to consider in approving or declining the transaction.

In this exemplary embodiment, the mobile device 116 also displays, at 340, the "failed" result notification to the user 112 and further informs the user 112 of the attempt to retry the transaction.

Upon receipt of the payment account credential, the POS terminal 114 compiles and transmits an authorization request for the transaction, as described above with reference to 308, 310 and 312. The method 300, from there, may be repeated as necessary to ensure an approve or a decline result of the transaction is received by the POS terminal 114 and/or the mobile device 116, and also the user 112, thereby providing certainty as to status of the transaction to the user 112.

With that said, it should be appreciated that, in some embodiments, the identifier may be maintained in the authorization reply by the issuer 108 (rather than the payment network 106) whereby the issuer 108 would compile the authorization reply with the identifier included therein, prior to transmitting the authorization reply to the payment network 106 (e.g., at step 326). In these embodiments, the acquirer 104 and the issuer 108 may be unchanged, while still providing the notification to the mobile device 116. It should further be appreciated that, in some embodiments, the POS terminal 114 may also store the identifier in association with the transaction (like the payment network 106 above), whereby, upon receipt of a conventional authorization reply, the POS terminal 114 may retrieve the identifier from memory (e.g., based on a transaction ID, terminal ID, etc.) and use the identifier (e.g., the BLE address, MAC address, etc.), for the specific transaction, to notify the mobile device 116 (and specifically, the virtual wallet application 118) of the result, thereby permitting the mobile device 116 (and also the POS terminal 114) to perform as described above. In these further embodiments, the acquirer 104, the payment network 106 and the issuer 108 may be unchanged, while still providing the notification to the mobile device 116.

In view of the above, the systems and methods herein permit the users to be informed, at their mobile devices, about the status of transactions, even when network and/or communication issues exist between the POS terminals and one or more other devices and/or entities described above. This information is further passed to the mobile devices without requiring any messaging directly between issuers of the respective payment accounts and the mobile devices, thereby relying on existing data flows to deliver additional information and/or reducing costs associated with the transactions (e.g., network traffic costs, etc.). Furthermore, providing a status or result notification to the mobile devices (or virtual wallet applications) is contrary to conventional tap to pay data flows, where there is no feedback to the mobile devices and/or the virtual wallet applications therein regarding the status of the transactions because, at the time of the results, the mobile devices are often outside of a wireless range (e.g., the about four centimeters of the NFC ranges, etc.) of the POS terminals. By employing an alternate wireless network, in certain embodiments, the POS terminals ensure communication with the mobile devices (e.g., to provide the status and/or result, etc.) even when the mobile devices are outside the NFC range (i.e., the NFC connection whereby the payment account credential was provided to initiate the transaction). What's more, a transaction retry is permitted for a transaction without having to re-authenticate the user, thereby reducing the friction of the retry transaction with the user, previously resulting from network and/or communication issues. And, further, by providing the result to the virtual wallet application (whereby a status of the transaction and prior transactions is/are maintained at the virtual wallet application), certain metrics, such as, for example, transaction velocity checks, etc. may be implemented directly at the mobile device and/or virtual wallet application (i.e., locally, rather than remotely) to provide enhanced payment account data to the users.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, by a computing device, via a first wireless connection, a credential from a mobile device in connection with a network transaction, the credential specific to an account associated with the mobile device; (b) determining, by the computing device, an identifier of the mobile device; (c) compiling, by the computing device, an authorization request for the network transaction, the authorization request including the identifier and the credential; (d) transmitting, by the computing device, the authorization request to a first party for authorization of the request; (e) receiving, by the computing device, an authorization reply, in response to the authorization request, the authorization reply including a result for the network transaction and the identifier; and (f) transmitting, by the computing device, via a second wireless connection, a notification, including the result of the network transaction, to the mobile device, based on the identifier included in the authorization reply, the first wireless connection being different than the second wireless connection.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating a network transaction, the method comprising:

receiving, by a computing device, via a first wireless connection, a credential from a mobile device in connection with a network transaction and in response to authentication of a user associated with the credential, the credential specific to an account associated with the mobile device;

transmitting, by the computing device, via the first wireless connection, transaction data for the network transaction to the mobile device;

determining, by the computing device, an identifier of the mobile device;

compiling, by the computing device, an authorization request for the network transaction, the authorization request including the identifier and the credential, wherein the identifier is included in a data element of the authorization request;

transmitting, by the computing device, the authorization request to a first party for authorization of the authorization request;

receiving, by the computing device, an authorization reply, in response to the authorization request, the authorization reply including a result for the network transaction and the identifier, wherein the result of the network transaction is a failed transaction result distinct from a declined transaction result, and wherein the identifier is included in a data element of the authorization reply; and in response to the authorization reply including the failed transaction result:

transmitting, by the computing device, via a second wireless connection, a notification to the mobile device, based on the identifier included in the authorization reply, the notification including the failed transaction result of the network transaction and the transaction data, thereby permitting the mobile device to provide the credential, in response to the notification, as a retry based on the transaction data included in the notification being consistent with the transaction data transmitted to the mobile device, the first wireless connection being different than the second wireless connection;

receiving, by the computing device, the credential from the mobile device in connection with the retry of the network transaction, without further authenticating the user associated with the credential; and compiling and transmitting, by the computing device, a second authorization request to the first party as the retry for the network transaction, the second authorization request including at least the credential.

2. The computer-implemented method of claim 1, wherein determining the identifier of the mobile device includes receiving the identifier, from the mobile device, via the first wireless connection.

3. The computer-implemented method of claim 2, wherein the first wireless connection is a near-field communication (NFC) connection.

4. The computer-implemented method of claim 3, further comprising establishing the second wireless connection with the mobile device based on the identifier, prior to transmitting the notification to the mobile device.

5. The computer-implemented method of claim 4, wherein the second wireless connection includes a Bluetooth® connection; and wherein the identifier includes a Bluetooth® Low Energy (BLE) address.

6. The computer-implemented method of claim 1, wherein the transaction data includes an amount of the network transaction, a terminal ID associated with the network transaction, and/or a currency of the network transaction.

7. The computer-implemented method of claim 1, wherein receiving the credential includes receiving the credential via a NFC connection with the mobile device.

8. A non-transitory computer readable storage media including executable instructions, which, when executed by a processor, cause the processor to:

receive, via a first wireless connection, a payment account credential and an identifier from a mobile device in connection with a network transaction, the payment account credential specific to an account associated with the mobile device, the identifier specific to the mobile device;

transmit, via the first wireless connection, transaction data for the network transaction to the mobile device;

compile an authorization request for the network transaction, the authorization request including the payment account credential and the identifier;

transmit the authorization request to an acquirer;

receive, from the acquirer, an authorization reply, in response to the authorization request, the authorization reply including a result for the network transaction and the identifier, wherein the result for the network transaction includes a failed transaction result; and in response to the failed transaction result, transmit, via a second wireless connection, a notification to the mobile device, based on the identifier included in the authorization reply, the notification including the failed transaction result of the network transaction and the transaction data, thereby permitting the mobile device to provide the payment account credential, in response to the notification, as a retry based on the transaction data included in the notification being consistent with the transaction data transmitted to the mobile device, the first wireless connection being different than the second wireless connection.

9. The non-transitory computer readable storage media of claim 8, wherein the first wireless connection is a near-field communication (NFC) connection; and wherein the storage media further includes executable instructions, which, when executed by the processor, cause the processor to establish the second wireless connection with the mobile device based on the identifier, prior to transmitting the notification to the mobile device.

10. The non-transitory computer readable storage media of claim 9, wherein the second wireless connection includes a Bluetooth® connection; and wherein the identifier includes a Bluetooth® Low Energy (BLE) address.

11. The non-transitory computer readable storage media of claim 9, wherein the transaction data includes an amount of the network transaction, a terminal ID associated with the network transaction, and/or a currency of the network transaction.

12. The non-transitory computer readable storage media of claim 9, wherein the failed transaction result is distinct from a declined transaction result; and wherein the storage media further includes executable instructions, which, when executed by the processor, cause the processor to:

in response to the notification including the failed transaction result:

receive the payment account credential from the mobile device independent of an authentication of a user associated with the account at the mobile device, specific to the retry of the network transaction;

compile a second authorization request for the retry of the network transaction, the second authorization request including at least the payment account credential; and transmit the second authorization request to the acquirer as the retry of the network transaction.

13. The non-transitory computer readable storage media of claim 12, wherein the storage media includes executable instructions, which, when executed by the processor, cause the processor, in order to receive the payment account credential in response to the notification including the failed transaction result, to receive the payment account credential from the mobile device, via a NFC connection.

14. The non-transitory computer readable storage media of claim 12, wherein the authorization request includes an authentication status indicating authentication of a user associated with the account in connection with the network transaction.

15. A system for use in facilitating retry transactions in connection with network and/or connection issues associated with wireless payment transactions, the system comprising:
a point-of-sale (POS) computing device configured to:
receive, via near-field communication (NFC), from a mobile device, a payment account credential and an identifier specific to the mobile device in connection with a payment transaction and in response to authentication of a user associated with the payment account credential, the payment account credential specific to a payment account associated with the mobile device;
transmit, via NFC, transaction data for the payment transaction to the mobile device;
compile and transmit, to a first party, an authorization request for the payment transaction, the authorization request including the identifier and the payment account credential;
receive an authorization reply, in response to the authorization request, the authorization reply including a result for the payment transaction and the identifier; and
when the result includes a failed transaction result distinct from a declined transaction result:
transmit, via a wireless network and based on the identifier of the mobile device, a notification to the mobile device indicating that the result includes the failed transaction result, the notification including the transaction data, thereby permitting the mobile device to provide the payment account credential, in response to the notification, as a retry based on the transaction data included in the notification being consistent with the transaction data transmitted to the mobile device;
in response to the notification, receive the payment account credential specific to the payment account from the mobile device, via the wireless network, without another authentication of the user; and
compile and transmit, to the first party, an authorization request for the retry of the payment transaction, the authorization request for the retry including at least the payment account credential.

16. The system of claim 15, further comprising a non-transitory computer readable storage media including executable instructions for a virtual wallet application, which, when executed by the mobile device, cause the mobile device to:
receive the transaction data from the POS computing device;
receive the notification from the POS computing device;
compare the received transaction data and the transaction data included in the notification; and
provide the payment account credential to the POS computing device for the retry of the payment transaction based on the received transaction data and the transaction data included in the notification being consistent.

17. The system of claim 16, wherein the received transaction data and the transaction data included in the notification include a transaction amount for the payment transaction, a transaction currency for the payment transaction, and/or a terminal ID associated with the POS computing device.

18. The system of claim 16, wherein the wireless network includes a Bluetooth® network and the identifier includes a Bluetooth® Low Energy (BLE) address.

* * * * *